H. H. Palmer,
Horseshoe.
N° 51,078.   Patented Nov. 21, 1865.
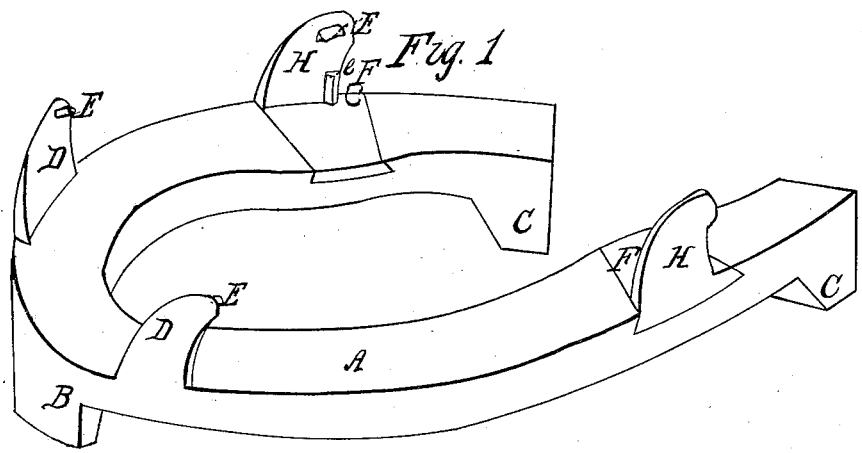
Witnesses  
Edward H. Knight  
Chas. C. Wilson
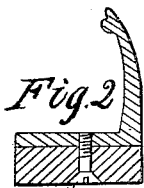
Inventor  
Henry H. Palmer  
by Munn & Co  
Attys

UNITED STATES PATENT OFFICE.

HENRY H. PALMER, OF ROCKFORD, ILLINOIS.

IMPROVEMENT IN HORSESHOES.

Specification forming part of Letters Patent No. 51,078, dated November 21, 1865.

*To all whom it may concern:*

Be it known that I, HENRY H. PALMER, of Rockford, Winnebago county, in the State of Illinois, have made new and useful Improvements in Horseshoes; and I do hereby declare the following to be a full, clear, and exact description of the nature, construction, and operation of the same, sufficient to enable one skilled in the art to which it appertains to construct and use the same, reference being had to the accompanying drawings, which are made part of this specification, and in which—

Figure 1 is a perspective view of the horseshoe. Fig. 2 is a transverse section.

My invention consists of a shoe provided with movable clips or flanges fitted in dovetailed grooves which extend across the upper side of the shoe and with other stationary clips which, together with the movable ones, embrace the hoof of the horse and permit the fastening on or the removal of the shoe as occasion may require.

In the drawings, A is the shoe; B, the toe-piece; C, the heel-calks. D D are stationary clips or flanges projecting from the upper surface of the shoe, and either adapted to embrace the exterior wall of the hoof or to be sunk into grooves therein. E E are points on these clips, which are adapted to penetrate the hoof and retain the shoe in position. F F are plates from which rise clips H H, similar to clips D, excepting that they are movable as the plate F slips back and forth in the dovetailed grooves in the upper edge of the shoe, being secured in position by the screws G, which pass through the shoe A and plate F, entering from below, so as to be fastened when the shoe is arranged on the hoof of the animal.

In placing the shoe upon the hoof of the animal the clips D D, as well as the upper surface, are properly fitted, and then the clips H H are brought to their place, so that the points E enter holes previously prepared and the plates F reach such a position that the screws G may be enabled to enter and hold them firmly. The flange $e$ on the side of the clip, being embedded in the hoof, prevents the shaking motion of the shoe backward and forward, which would have a tendency to impair the hold of the points E upon the hoof. More screws than one may be used, if necessary.

The set-screws G, which secure the plates H to the shoes, may be used to assist in retaining the shoe in its place by projection into the hoof of the horse, and thus act as auxiliaries to the flanges.

It is a very common and fatal error in shoeing to make the hoof of the horse to fit the shoe, whereas the converse of the proposition is the only correct method, as there is only a certain portion of the wall of the hoof that is suitable for the retention of the device for retaining the shoe on the foot.

In my invention each side of the shoe is provided with a movable clip, so that the proper fitting is much facilitated, as there is greater room for adjustment.

I do not claim, broadly, the fastening of the shoe by fitting a piece into the upper side of the shoe, as I am aware this has been done before, but in such a manner as not to be of practical use, the flange being of such shape as to retain sand in all the vacancies not occupied by the hoof of the horse, and thus chafe and wear it, besides which it is not easily fitted to the shape of the foot. The downward thrust upon a narrow plate has a tendency to rock it upon the shoe, and thus bring a strain upon the set-screw in holding the flange in its place, the screw thus being liable to wear and become loose, while by this arrangement the plate, when it fits in the shoe, is nearly straight and of bevel shape and extends across the shoe, and when fitted in its place cannot strain upon its fastening from the length of surface held in dovetail, and there is no strain upon the screw, except the outward pressure of the foot. The flange being longer than it is wide, and of rather a curved or irregular shape, it may extend on up to the hoof, so as to get a sufficient hold without presenting a clumsy appearance, and will not retain the sand, so as to wear and injure the foot.

Having thus described my invention, what I claim therein as new, and desire to secure by Letters Patent, is—

1. The combination, in the shoe, of the stationary clips D, and the movable clips H on the plates F, which are fitted into the dovetail grooves extending across the upper portion of each side of the shoe and secured therein by set-screws G, substantially as described and represented.

2. The auxiliary projection $e$ on the clip H, as and for the purpose described.

HENRY H. PALMER.

Witnesses.
  OCTAVIUS KNIGHT,
  JOHN A. WIEDERSHEIM.